(12) United States Patent
Walsh et al.

(10) Patent No.: US 11,928,960 B2
(45) Date of Patent: *Mar. 12, 2024

(54) SYSTEMS AND METHODS FOR ALERTING DRIVERS OF APPROACHING EMERGENCY VEHICLES

(71) Applicant: Invent F & W, LLC, St. Louis, MO (US)

(72) Inventors: Michael Walsh, St. Louis, MO (US); Virginia E. Foster, St. Louis, MO (US); Ryan McNeely, St. Louis, MO (US)

(73) Assignee: Invent F & W, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,486

(22) Filed: May 24, 2023

(65) Prior Publication Data
US 2023/0298465 A1    Sep. 21, 2023

Related U.S. Application Data

(63) Continuation of application No. 17/091,477, filed on Nov. 6, 2020, now abandoned, which is a
(Continued)

(51) Int. Cl.
*G08G 1/0965* (2006.01)
(52) U.S. Cl.
CPC .................. *G08G 1/0965* (2013.01)
(58) Field of Classification Search
CPC ........................................................ G08G 1/0965
See application file for complete search history.

(56) References Cited

U.S. PATENT DOCUMENTS

| 5,307,060 A | 4/1994 | Prevulsky et al. |
| 6,529,831 B1 | 3/2003 | Smith et al. |
(Continued)

FOREIGN PATENT DOCUMENTS

EP          0773524 A1      5/1997

OTHER PUBLICATIONS

International Search Report and Written Opinion issued for PCT/US2016/014043, dated Mar. 29, 2016, 9 pages.

*Primary Examiner* — Patrick N Edouard
*Assistant Examiner* — Eboni N Giles
(74) *Attorney, Agent, or Firm* — Lewis Rice LLC (57) ABSTRACT

A computer-implemented method for alerting passenger vehicles of approaching emergency vehicles is implemented by an alert management computing device. The method includes receiving an emergency vehicle alert request message from an emergency vehicle transmitter, receiving passenger vehicle location data from a plurality of passenger vehicle user computing devices located in a plurality of passenger vehicles, wherein the passenger vehicle location data includes a present passenger vehicle location and a present passenger vehicle trajectory, identifying an alert zone for the emergency vehicle based on the present emergency vehicle location and the present emergency vehicle trajectory, identifying a vehicle zone for each of the plurality of passenger vehicles, identifying a subset of the passenger vehicles within the alert zone by comparing each vehicle zone to the alert zone, and transmitting a warning to the subset of passenger vehicles via the passenger vehicle user computing devices.

25 Claims, 5 Drawing Sheets

Related U.S. Application Data continuation of application No. 16/188,395, filed on Nov. 13, 2018, now Pat. No. 10,891,858, which is a continuation of application No. 14/600,925, filed on Jan. 20, 2015, now Pat. No. 10,127,813.

(56) References Cited

U.S. PATENT DOCUMENTS

| | | |
|---|---|---|
| 6,630,891 B1 | 10/2003 | Dilling |
| 6,630,892 B1 | 10/2003 | Crockford et al. |
| 6,700,504 B1 | 3/2004 | Aslandogan et al. |
| 6,778,101 B2 | 8/2004 | Turbeville et al. |
| 6,792,351 B2 * | 9/2004 | Lutter .................. G08G 1/164 701/515 |
| 6,859,147 B2 | 2/2005 | Buscemi |
| 6,985,089 B2 | 1/2006 | Liu et al. |
| 7,099,776 B2 | 8/2006 | King et al. |
| 7,161,485 B2 | 1/2007 | Melman |
| 7,271,736 B2 | 9/2007 | Siegel et al. |
| 7,525,447 B2 | 4/2009 | Galindo |
| 7,629,898 B2 | 12/2009 | Kirkpatrick |
| 7,772,996 B2 | 8/2010 | Burns |
| 8,258,979 B2 | 9/2012 | Lemmons et al. |
| 8,258,989 B2 | 9/2012 | Nakagawa |
| 8,350,721 B2 | 1/2013 | Carr |
| 8,604,918 B2 | 12/2013 | Jun |
| 8,838,321 B1 | 9/2014 | Ferguson |
| 8,842,021 B2 | 9/2014 | Behm et al. |
| 8,849,557 B1 | 9/2014 | Levandowski et al. |
| 8,884,787 B2 | 11/2014 | Burns |
| 8,989,699 B2 | 3/2015 | Hatton et al. |
| 9,053,637 B2 | 6/2015 | Mawbey et al. |
| 9,254,781 B2 | 2/2016 | Applebaum |
| 10,127,813 B2 | 11/2018 | Walsh et al. |
| 2003/0122930 A1 * | 7/2003 | Schofield .............. H04N 7/181 348/E7.086 |
| 2004/0246144 A1 * | 12/2004 | Siegel ................. G08G 1/0965 340/902 |
| 2006/0184319 A1 * | 8/2006 | Seick .................... G01C 21/28 340/995.19 |
| 2007/0054685 A1 | 3/2007 | Kellum |
| 2007/0159354 A1 | 7/2007 | Rosenberg |
| 2007/0273551 A1 | 11/2007 | Jacobs et al. |
| 2008/0074286 A1 | 3/2008 | Gill et al. |
| 2008/0106435 A1 | 5/2008 | Kirkpatrick |
| 2008/0186382 A1 | 8/2008 | Tauchi et al. |
| 2009/0174572 A1 | 7/2009 | Smith |
| 2010/0019932 A1 * | 1/2010 | Goodwin ............... G08G 1/162 340/902 |
| 2012/0136559 A1 | 5/2012 | Rothschild |
| 2012/0313792 A1 | 12/2012 | Behm et al. |
| 2014/0354449 A1 * | 12/2014 | Alam .................... G08G 1/164 340/902 |
| 2014/0365104 A1 * | 12/2014 | Sasaki ............ B60W 30/18154 701/119 |
| 2015/0254978 A1 | 9/2015 | Mawbey et al. |
| 2016/0071417 A1 | 3/2016 | Lewis et al. |
| 2016/0210858 A1 | 7/2016 | Foster et al. |
| 2017/0067747 A1 | 3/2017 | Ricci |
| 2017/0182934 A1 | 6/2017 | Arita et al. |

* cited by examiner

SYSTEMS AND METHODS FOR ALERTING DRIVERS OF APPROACHING EMERGENCY VEHICLES

CROSS REFERENCE TO RELATED APPLICATIONS

This application is a continuation of U.S. patent application Ser. No. 17/091,477, filed Nov. 6, 2020, which is a continuation of U.S. patent application Ser. No. 16/188,395, which filed Nov. 13, 2018, which issued as U.S. Pat. No. 10,891,858 on Jan. 12, 2021, which is a continuation of U.S. patent application Ser. No. 14/600,925, filed Jan. 20, 2015, which issued as U.S. Pat. No. 10,127,813 on Nov. 13, 2018, which are hereby incorporated by reference in their entireties.

BACKGROUND

The field of the disclosure relates generally to emergency vehicles, and more particularly, to methods and systems for alerting drivers to approaching emergency vehicles.

Because of the often urgent circumstances of emergency incidents, many emergency vehicles travel at accelerated speeds (compared to other traffic) and ignore traffic signals and stops to ensure timely arrival to emergency incident locations or related locations, such as hospitals. Such driving practices may cause emergency vehicles to be at elevated risks of collision with other vehicles on the road. Due to such driving practices, many emergency vehicles use visual and auditory alerts, including lights and sirens, when traveling to and from emergency incident locations. Such alerts are used to mitigate the elevated risks of collision.

Despite the use of such alerts, the elevated risk of collision remains a problem. At least partially due to driver distraction, emergency vehicle alerts may not be noticed by drivers in a timely manner. When drivers fail to notice such alerts, the risk of collision with emergency vehicles increases. Accordingly, systems for improving the alerts of approaching emergency vehicles may be useful to mitigate the risk of collisions between emergency vehicles and other vehicles.

BRIEF DESCRIPTION

In one aspect, a computer-implemented method for alerting passenger vehicles of approaching emergency vehicles is provided. The method is implemented by an alert management computing device including a processor and a memory device coupled to the processor. The method includes receiving an emergency vehicle alert request message from an emergency vehicle transmitter, wherein the emergency vehicle alert request message includes a present emergency vehicle location and a present emergency vehicle trajectory. The method also includes receiving passenger vehicle location data from a plurality of passenger vehicle user computing devices located in a plurality of passenger vehicles, wherein the passenger vehicle location data includes a present passenger vehicle location and a present passenger vehicle trajectory. The method additionally includes identifying an alert zone for the emergency vehicle based on the present emergency vehicle location and the present emergency vehicle trajectory. Further, the method includes identifying a vehicle zone for each of the plurality of passenger vehicles based on the present passenger vehicle location and the present passenger vehicle trajectory. Moreover, the method includes identifying a subset of the passenger vehicles within the alert zone by comparing each vehicle zone to the alert zone. Also, the method includes transmitting a warning to the subset of passenger vehicles via the passenger vehicle user computing devices, wherein the warning includes an alert zone description describing characteristics of the alert zone.

In a further aspect, an alert management computing device for alerting passenger vehicles of approaching emergency vehicles is provided. The alert management computing device includes a processor and a memory coupled to the processor. The processor is configured to receive an emergency vehicle alert request message from an emergency vehicle transmitter, wherein the emergency vehicle alert request message includes a present emergency vehicle location and a present emergency vehicle trajectory, receive passenger vehicle location data from a plurality of passenger vehicle user computing devices located in a plurality of passenger vehicles, wherein the passenger vehicle location data includes a present passenger vehicle location and a present passenger vehicle trajectory, identify an alert zone for the emergency vehicle based on the present emergency vehicle location and the present emergency vehicle trajectory, identify a vehicle zone for each of the plurality of passenger vehicles based on the present passenger vehicle location and the present passenger vehicle trajectory, identify a subset of the passenger vehicles within the alert zone by comparing each vehicle zone to the alert zone, and transmit a warning to the subset of passenger vehicles via the passenger vehicle user computing devices, wherein the warning includes an alert zone description describing characteristics of the alert zone.

In another aspect, a passenger vehicle user computing device for receiving alerts regarding approaching emergency vehicles is provided. The passenger vehicle user computing device includes a processor and a memory device coupled to the processor. The passenger vehicle user computing device is configured to retrieve location service information associated with the passenger vehicle user computing device from a location services routine, identify a present passenger vehicle location and a present passenger vehicle trajectory based on the location service information, and transmit a set of passenger vehicle location data to an alert management computing device, receive a warning from the alert management computing device including an alert zone description describing characteristics of an alert zone, wherein the alert zone defines a region projected to contain at least one emergency vehicle, and generate a user alert upon determining that the present passenger vehicle location is included within the alert zone.

In yet another aspect, an emergency vehicle alert system for alerting passenger vehicles of approaching emergency vehicles. The emergency vehicle alert system includes an emergency vehicle transmitter device coupled to an emergency vehicle, an alert management computing device, and a passenger vehicle user computing device. The alert management computing device includes a first processor and a first memory coupled to the first processor. The passenger vehicle user computing device includes a second processor and a second memory coupled to the second processor. The first processor is configured to receive an emergency vehicle alert request message from said emergency vehicle transmitter via wireless communication, wherein the emergency vehicle alert request message includes a present emergency vehicle location and a present emergency vehicle trajectory, receive passenger vehicle location data from said passenger vehicle user computing device, wherein the passenger vehicle location data includes a present passenger vehicle location and a present passenger vehicle trajectory, identify an alert zone for the emergency vehicle based on the present emergency vehicle location and the present emergency vehicle trajectory, identify a vehicle zone for said passenger vehicles based on the present passenger vehicle location and the present passenger vehicle trajectory, identify a subset of the passenger vehicles within the alert zone by comparing each vehicle zone to the alert zone, and transmit a warning to said passenger vehicle user computing device, wherein the warning includes an alert zone description describing characteristics of the alert zone.

In a further aspect, an emergency vehicle user computing device is provided. The emergency vehicle user computing device is configured to receive alerts regarding approaching emergency vehicles. The emergency vehicle computing device includes a processor and a memory coupled to the processor. The processor is configured to retrieve location service information associated with the emergency vehicle user computing device from a location services routine, identify a present emergency vehicle location and a present emergency vehicle trajectory based on the location service information, transmit a set of emergency vehicle location data to an alert management computing device, receive a warning from the alert management computing device including an alert zone description describing characteristics of an alert zone, wherein the alert zone defines a region projected to contain a second emergency vehicle, and generate a user alert upon determining that the present emergency vehicle location is included within the alert zone.

DRAWINGS

These and other features, aspects, and advantages will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As described herein, "emergency vehicles" and related terms may refer to any vehicle that may be responsive to emergencies including police department vehicles, fire department vehicles, emergency medical vehicles, and other emergency response vehicles. As described, such emergency vehicles may respond to emergency incidents at emergency incident locations. Due to the exigent circumstances of crisis situations, such emergency vehicles may routinely travel at elevated speeds and disregard traffic rules that may otherwise be in place on roads and highways. However, it is understood that the systems described herein may also be used to facilitate location alerts for other vehicles including, but not limited to, construction vehicles and related equipment, parade and event vehicles including floats, public demonstration vehicles, and funeral related vehicles.

As described herein, "passenger vehicles" and related terms may refer to any personal, public, or commercial vehicle on roadways that is not an emergency vehicle. As described, such passenger vehicles are routinely obligated to yield to emergency vehicles when such vehicles are responding to emergency situations by pulling over or otherwise avoiding the obstruction of such vehicles. As described herein, in some examples, passenger vehicles may include autonomous vehicles (e.g., computer-navigated and controlled vehicles) that contain passengers. The systems and methods described are configured to interact with such vehicles in a similar manner.

Computer systems, such as the alert management computing device and the passenger vehicle user computing device are described, and such computer systems include a processor and a memory. However, any processor in a computer device referred to herein may also refer to one or more processors wherein the processor may be in one computing device or a plurality of computing devices acting in parallel. Additionally, any memory in a computer device referred to may also refer to one or more memories, wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an exemplary embodiment, the system is executed on a single computer system, without requiring a connection to a server computer. In a further embodiment, the system is run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As described above, the elevated risk of collision between passenger vehicles and emergency vehicles is a serious concern. Despite the use of alerts (e.g., sirens and lights), many passenger vehicle drivers may not detect oncoming emergency vehicles in a timely manner. At least partially due to driver distraction, emergency vehicle alerts may not be noticed by drivers in a suitable timeframe. When drivers fail to notice such alerts, the risk of collision between passenger vehicles and emergency vehicles increases. Accordingly, systems for improving alerts of approaching emergency vehicles may be useful to mitigate the risk of collisions between emergency vehicles and other vehicles.

The systems and methods described herein overcome the limitations of known emergency vehicle alert systems by providing alerts to a subset of passenger vehicle drivers in a likely path of an emergency vehicle and by presenting such alerts via passenger vehicle user computing devices. The systems described determine alert zones that emergency vehicles are in (or may be in) and send user alerts to passenger vehicles within such alert zones via software at a passenger vehicle user computing device (e.g., a smartphone). As a result, passenger vehicles are only alerted when there is likelihood that they will encounter an emergency vehicle. Thus, the systems described also improve on the problem of inattentive drivers by reducing excessive noise and competition for the attention of drivers. Additionally, passenger vehicles are alerted via computing devices such as smartphones that may already occupy the attention of the driver of the passenger vehicles. Therefore, drivers that are focused on such computing devices may be more easily alerted to the presence of an emergency vehicle. Additionally, by not limiting the alerts to the requirements of physical space, alerts may be sent to drivers significantly before they could hear a siren or see flashing lights. Further, drivers that are very proximate to an emergency vehicle but unlikely to face such a vehicle (e.g., a driver on a highway going in an opposite direction of an emergency vehicle) will not be alerted by this system. Thus, the systems also allow for focused alerts to particular drivers that may encounter emergency vehicles.

The computer-implemented systems and methods described herein provide an efficient approach for alerting passenger vehicles of approaching emergency vehicles. The systems described include three primary components: (1) an emergency vehicle transmitter device in an emergency vehicle, (2) an alert management computing device, and (3) a passenger vehicle user computing device in a passenger vehicle. The alert management computing device manages communications between computing devices associated with emergency vehicles and passenger vehicles to alert passenger vehicles to approaching emergency vehicles. More specifically, the alert management computing device is configured to (a) receive an emergency vehicle alert request message from an emergency vehicle transmitter, wherein the emergency vehicle alert request message includes a present emergency vehicle location and a present emergency vehicle trajectory, (b) receive passenger vehicle location data from a plurality of passenger vehicle user computing devices located in a plurality of passenger vehicles, wherein the passenger vehicle location data includes a present passenger vehicle location and a present passenger vehicle trajectory, (c) identify an alert zone for the emergency vehicle based on the present emergency vehicle location and the present emergency vehicle trajectory, (d) identify a vehicle zone for each of the plurality of passenger vehicles based on the present passenger vehicle location and the present passenger vehicle trajectory, (e) identify a subset of the passenger vehicles within the alert zone by comparing each vehicle zone to the alert zone, and (f) transmit a warning to the subset of passenger vehicles via the passenger vehicle user computing devices, wherein the warning includes an alert zone description describing characteristics of the alert zone.

As described above, alert management computing device manages communications between computing devices associated with emergency vehicles and passenger vehicles. More specifically, the alert management computing device receives information from transmitter devices located in emergency vehicles ("emergency vehicle transmitter devices"), processes the received information to identify locations where emergency vehicles may be ("alert zones"), and relays the alert zones to passenger vehicles via passenger vehicle user computing devices. Further, as described below and herein, the alert management computing device also manages communications between computing devices of emergency vehicles to facilitate coordination of emergency vehicle traffic.

An emergency vehicle includes an emergency vehicle transmitter device coupled to the emergency vehicle. In an example embodiment, the emergency vehicle transmitter device is an electronic device installed inside the emergency vehicle. The emergency vehicle transmitter device includes a processor in communication with a memory and a communications interface that may be used to communicate with at least the alert management computing device. The processor may be configured to execute the processes of monitoring and communication described herein. The memory may be configured to store any suitable information including instructions for monitoring and communication described herein. The emergency vehicle transmitter device is also configured to identify and provide location information including an emergency vehicle location, an emergency vehicle trajectory, an emergency vehicle velocity, and emergency vehicle acceleration. In some examples, the emergency vehicle transmitter device may use any suitable location tools to identify such location information including but not limited to gyroscopes, accelerometers, cellular communication triangulation methods, and global positioning systems. In some such examples, the emergency vehicle transmitter device specifically uses global positioning software and hardware installed within the emergency vehicle transmitter device or a computing device that is in communication with the emergency vehicle transmitter device (e.g., a smartphone).

As described herein, the emergency vehicle transmitter device is in wireless communication with the alert management computing device using any suitable protocol. In one example, the emergency vehicle transmitter device communicates with the alert management computing device using any suitable data network including a cellular data network. In other examples, the emergency vehicle transmitter device may communicate with the alert management computing device using any suitable protocol including radio communication, Bluetooth, WiFi communication, known proximity protocols, or any other suitable protocols. In further examples, the emergency vehicle transmitter device may communicate with the alert management computing device using satellite communications protocols.

The emergency vehicle transmitter device monitors the emergency vehicle for an indication of an emergency condition (i.e., an indication that the emergency vehicle is being used to respond to an emergency.)

In a first example, the emergency vehicle transmitter device monitors for an audible signal such as a siren. The emergency vehicle transmitter device may monitor for the audible signal based on a minimum decibel threshold (i.e., by detecting a noise at the volume level of the siren), based on a frequency comparison (i.e., by detecting a frequency corresponding to the siren) or any combination thereof. In some examples, the emergency vehicle transmitter device may verify that a siren is activated by verifying the detection of the siren for a minimum period of time. In one example, the emergency vehicle transmitter device determines that a minimum decibel threshold or a frequency match is met for two seconds. In a further example, the emergency vehicle transmitter device determines that a minimum decibel threshold or a frequency match is met for a set number of periods (or intervals) or a pre-determined period of time.

In a second example, the emergency vehicle transmitter device may detect a visual indication such as a flashing light. The emergency vehicle transmitter device may monitor for lights with a particular pattern or wavelengths corresponding to an alert light for the emergency vehicle. Further, the emergency vehicle transmitter device may verify the visual indication by checking that the visual indication persists for a particular period of time.

In a third example, the emergency vehicle transmitter device may be hard-wired to be activated in conjunction with at least one of a siren and a flashing light.

In a fourth example, the emergency vehicle transmitter device may be manually activated by a user such as an emergency vehicle driver or passenger.

Upon detection of an emergency condition (based on any of the examples listed or any other suitable example), the emergency vehicle transmitter device transmits an emergency vehicle alert request message to the alert management computing device. The emergency vehicle alert request message includes information related to the travel of the emergency vehicle including, for example, the present emergency vehicle location and the present emergency vehicle trajectory (or the present emergency vehicle orientation). The emergency vehicle alert request message may also include a present emergency vehicle speed (or velocity) and a present emergency vehicle acceleration. Such information may be detected using location services available to the emergency vehicle transmitter device, as described above. The emergency vehicle alert request message may also include a timestamp that may be used by the alert management computing device to process the emergency vehicle alert request message (i.e., to distinguish an earlier emergency vehicle alert request from a later emergency vehicle alert requests.) As described below, the alert management computing device may utilize multiple successive emergency vehicle alert request messages (distinguished based on timestamps) to infer trajectory, intended destination, velocity, and other characteristics of the emergency vehicle route.

Further, in at least some examples, the emergency vehicle alert request message may include identification information for a particular emergency vehicle. Such information may be known as a "cooperation identifier" because it may be used to distinguish between multiple emergency vehicles. As described herein, such cooperation identifiers may be used to allow emergency vehicles to detect the presence of other emergency vehicles using the systems and methods described herein. In further examples, the emergency vehicle alert request message may also include information regarding the intended route or destination of the emergency vehicle.

In some examples, the emergency vehicle transmitter device may access information related to the emergency vehicle route to identify anticipated future locations. In one example, the emergency vehicle transmitter device may be integrated with computing devices that include mapping and navigation software. In such an example, the emergency vehicle transmitter device may be able to detect the actual intended route of the emergency vehicle and to further detect revisions in the intended route. In a second example, the emergency vehicle transmitter device may be integrated with computing devices and detect the locations of known possible destinations including hospitals, police departments, and fire departments. In such an example, the emergency vehicle transmitter device may use such location information to estimate the intended route of the emergency vehicle. In a third example, the emergency vehicle transmitter device may include an input (or be in communication with another computing device that may receive such an input) of an intended destination from a user such as the emergency vehicle driver.

Accordingly, in one example, an example emergency vehicle alert request message may be described as indicated below (Table 1):

TABLE 1

| Timestamp | Present Location | Present Trajectory (Relative to North) | Present Velocity | Present Acceleration | Projected Destination |
|---|---|---|---|---|---|
| Jan. 1, 2016 12:00 PM | 38.607814, −90.370989 | 157.5° | 100 km/hr | 1.1 m/s$^2$ | 39.607814, −91.370989 |

The alert management computing device receives the emergency vehicle alert request message from the emergency vehicle transmitter device and identifies an alert zone based on the emergency vehicle alert request message. In other words, the alert management computing device defines a range of locations where the emergency vehicle is likely to go. Such an area may be referred to as an "alert zone." Generally speaking, an alert zone is an area located in front of the emergency vehicle (where "front" is defined relative to the present trajectory). In alternative embodiments, the alert zone may be located behind the emergency vehicle (where "behind" is defined relative to the present trajectory.) The alert zone may include any potential path that the emergency vehicle may travel upon. For example, when emergency vehicles are near or nearing intersections, side streets, and alleys, the alert zone may include all potential paths until the emergency vehicle has selected one particular path (e.g., by physically passing a crossroads). Accordingly, regardless of the way that the emergency vehicle turns, all passenger vehicles on all possible paths may be alerted when they are within a set distance of the emergency vehicle or an intersection. As described below, the alert management computing device may factor several parameters in to determine the alert zone including, for example, the present emergency vehicle location, the present emergency vehicle trajectory, the present emergency vehicle acceleration, the present emergency vehicle velocity, and the present emergency vehicle acceleration. In some examples, the alert management computing device may factor additional parameters in to determine the alert zone including emergency vehicle routes and information related to such routes including emergency vehicle projected locations, emergency vehicle projected trajectories, emergency vehicle projected accelerations, emergency vehicle projected velocities, and emergency vehicle projected destinations.

The alert management computing device also receives mapping information to identify the present and projected location of the emergency vehicle in the context of roads and highways. Such mapping information may be retrieved from any suitable mapping service. Mapping information may include information regarding speed limits for roads, traffic stop indications, road widths, lane amounts, and other rules for roads. Traffic stop indications may include information identifying the presence of stop signs (and distinguishing the intersecting roads that do stop from those that do not where not all intersecting roads stop), identifying the presence of traffic signals, identifying the presence of rotaries, identifying the presence of one-way roads, and identifying the presence of yields.

In defining the alert zone, the alert management computing device predicts where the emergency vehicle may be within a particular period of time. In the example embodiment, the alert zone may define a region that the emergency vehicle may be in within the next minute. In other embodiments, the alert management computing device may be configured to predict the alert zone for other durations. In a first example, the alert management computing device projects the progress of the emergency vehicle based on present emergency vehicle trajectory, present emergency vehicle velocity, and present emergency vehicle location and forecasts that the emergency vehicle will continue on the same trajectory and at the same velocity. Therefore, in the first example, the alert zone may be a region of the areas that the emergency vehicle is forecasted to occupy for the particular period of time. Because emergency vehicles may move to get around vehicles and impediments, the alert zone may account for horizontal travel (i.e., shifting lanes left or right) as well as forward travel. In other examples, such as those described below, the alert zone may be adjusted based on other factors.

As described above, the emergency vehicle transmits present emergency vehicle acceleration within the emergency vehicle alert request message. When the emergency vehicle accelerates, the alert zone may accordingly expand because the emergency vehicle velocity is increasing and the emergency vehicle range of travel within the particular period of time accordingly increases. Similarly, when the emergency vehicle decelerates, the alert zone may accordingly contract because the emergency vehicle velocity is decreasing and the emergency vehicle range of travel within the particular period of time accordingly decreases. Further, when the emergency vehicle is stopped, the present emergency vehicle velocity may drop to zero and the alert zone may contract to a relatively small size because the emergency vehicle is at a low risk of motion.

The alert management computing device may also use mapping data, as described above, to determine that the emergency vehicle is approaching an intersection. At such intersections, the alert management computing device defines the alert zone factoring in the possibility that the emergency vehicle may take any possible road stemming from the intersection. As described below, when the emergency vehicle takes a turn, a clearing signal is issued to clear the paths not taken from the intersection.

The alert management computing device may also use mapping data, as described above, to determine that the emergency vehicle is on a highway. In many examples, highways include physical dividers that ensure that an emergency vehicle will not pass into an oncoming traffic lane. In such cases, in order to minimize the impact to drivers that will not encounter the emergency vehicle, the alert zone may only be defined to include the lanes in the flow of traffic with the emergency vehicle. (In contrast, on roads that do not include dividers, the alert zone may include the entirety of the road because the emergency vehicle may cross into lanes normally reserved for oncoming traffic.)

The alert management computing device may also use mapping data, as described above, to determine that the emergency vehicle is approaching a highway. In such examples, the alert zone may be defined in a manner similar to that used when an emergency vehicle approaches an intersection. Specifically, the alert zone may be defined for the possibility that the emergency vehicle enters the highway and the possibility that the emergency vehicle passes by a highway onramp. As described below, when the emergency vehicle passes by the onramp without entry, a clearing signal may be sent to the highway. Similarly, when the emergency vehicle enters the onramp, a clearing signal may be sent to the road that the emergency vehicle leaves.

In many examples, roads may overlap vertically when a road passes over or under another road. In such examples, the alert management computing device may define the alert zone to only include the roads that the emergency vehicle is actually on or likely to be on.

As mentioned above, the alert management computing device is configured to determine a clearing signal that defines areas formerly in an alert zone that are now "cleared." Effectively the clearing signal represents a negation of a portion of the alert zone. The clearing signal may be determined based on the fact that the emergency vehicle has passed by a portion of the alert zone or that the emergency vehicle has passed by an entry point to a road that the alert zone is on. The clearing signal is described in greater detail below.

In some examples, the alert management computing device may also calculate a duration of time that the alert zone remains active. The duration of time represents an effective period that the alert zone should be active before expiring. Because emergency vehicle is generally in motion, in some cases the alert management computing device may define a duration of period that the alert zone can be active before it is assumed that the emergency vehicle has left the alert zone. Due to potential losses of connectivity to the emergency vehicle transmitter device, it may be useful to use such an expiration period.

The alert management computing device also receives passenger vehicle location data from a plurality of passenger vehicle user computing devices located in a plurality of passenger vehicles. The passenger vehicle location data includes a present passenger vehicle location and a present passenger vehicle trajectory. In other words, the alert management computing device receives information from passenger vehicle user computing devices (e.g., smart phones) that may be used to define the current location of passenger vehicles and projected locations of the passenger vehicles in a manner similar to that used to define the current location and projected locations of emergency vehicles. Accordingly, the alert management computing device may also receive a present passenger vehicle velocity, a present passenger vehicle acceleration, a projected passenger vehicle location, a projected passenger vehicle trajectory, a projected passenger vehicle acceleration, and a projected passenger vehicle route.

The passenger vehicle user computing devices determine the passenger vehicle location data based on location service information. More specifically, passenger vehicle user computing devices may include location services that allow for the identification of a present passenger vehicle location and a present passenger vehicle trajectory. Such location services may include the use of accelerometers, gyroscopes, global positioning, and any other suitable systems that may be used to determine passenger vehicle location data. Alternately, locations services may be referred to as location services routines. Upon determining a present passenger vehicle location and a present passenger vehicle trajectory, the passenger vehicle user computing device may transmit a set of passenger vehicle location data to the alert management computing device.

In many embodiments, the passenger vehicle user computing device may be physically coupled to the passenger vehicle. However, in other embodiments, the passenger vehicle user computing device may be portable and associated with an individual within the passenger vehicle (e.g., the driver or a passenger.) In an example embodiment, the passenger vehicle user computing device may be a smartphone, a tablet computing device, wearable computing technology, or a cell phone. In such examples, the passenger vehicle user computing device may provide substantially similar functionality in other contexts. For example, the passenger vehicle user computing device may provide alerts to pedestrians, cyclists, and runners using methods substantially similar to those described herein. In other examples, the passenger vehicle user computing device may be context sensitive and configured to determine when and whether it is within a passenger vehicle. Such context detection may be achieved based on a minimum velocity or acceleration, communication with a secondary device in the passenger vehicle that describes the boundaries of the passenger vehicle (e.g., a transmitter or computing device located in the passenger vehicle that alerts the device that it is within a passenger vehicle), a network associated with the passenger vehicle changing the context of the device, or user-controlled settings that allow a user to indicate when the passenger vehicle user computing device is within a passenger vehicle. Simply, the passenger vehicle user computing device may be portable technology that is configured to perform the methods described herein when the passenger vehicle user computing device is at least within a passenger vehicle.

The alert management computing device processes the passenger vehicle location data and, more specifically, identifies a vehicle zone for each of the plurality of passenger vehicles based on the present passenger vehicle location and the present passenger vehicle trajectory. The alert management computing device further identifies a subset of the passenger vehicles within the alert zone by comparing each vehicle zone to the alert zone. In other words, the alert management computing device identifies passenger vehicles that should be alerted to the presence of the emergency vehicle by determining whether the vehicle zone at least partially overlaps with the alert zone. In at least some examples, a period of time that the vehicle zone and alert zone overlap may be determined based on the present velocities, present trajectories, present locations, and present accelerations of the passenger vehicle and the emergency vehicle. In such examples, the alert management computing device may define the alert zone to expire after such an overlap period ends.

The alert management computing device may also send a warning to the subset of passenger vehicles with vehicle zones at least partially overlapping with the alert zones. Such warnings may be transmitted via the passenger user computing devices. The warning includes an alert zone description describing characteristics of the alert zone. In some examples, the warning may be transmitted in conjunction with retrieved map data associated with a region containing the alert zone. Accordingly, the alert management computing device generates and transmits the warning including the map data and the alert zone, wherein the warning relates the alert zone to the map data.

The passenger vehicle user computing device may receive the warning from the alert management computing device including the alert zone description describing characteristics of an alert zone. The alert zone defines a region projected to contain at least one emergency vehicle. The passenger vehicle user computing device may also generate a user alert upon determining that the present passenger vehicle location is included within the alert zone.

In some examples, the passenger vehicle user computing device may also include mapping or navigation software. In such examples, the passenger vehicle user computing device may retrieve a set of routing data associated with the passenger user computing device that defines a set of projected passenger vehicle locations and a projected passenger vehicle velocity. In other words, the set of routing data may define an intended trip route for the passenger vehicle. The passenger vehicle user computing device may also compare the set of routing data to the alert zone received in the warning and generate the user alert upon determining that at least one of the projected passenger vehicle locations is included within the alert zone. Further, as described above, such mapping and navigation software may also include location and road information including speed limits. In such examples, the passenger vehicle user computing device may also identify a speed limit associated with each of the set of projected passenger vehicle locations and determine the projected passenger vehicle velocity associated with each of the set of projected passenger vehicle locations based on the associated speed limit. In other examples, the passenger vehicle user computing device may retrieve map data associated with a region containing the present passenger vehicle location and generate the user alert including the map data and the present passenger vehicle location, wherein the user alert relates the present passenger vehicle location to the map data.

The passenger vehicle user computing device may also indicate a more intense user alert when the emergency vehicle is more likely to be near the passenger vehicle. In one example, the passenger vehicle user computing device may identify a central point of the alert zone, the central point indicating a present location of an emergency vehicle, identify a distance between the present passenger vehicle location and the central point of the alert zone, and generate the user alert relative to the identified distance. The user alert may be variously louder, more intense, or more frequent as the identified distance decreases. As defined herein, the user alert may be auditory, visual, or any combination thereof.

As mentioned above, when the emergency vehicle has passed a portion of the alert zone or passed by potential roads that could be entered on, the alert management computing device transmits a clearing signal that removes areas of the alert zone from consideration. The passenger vehicle user computing device may receive a clearing message from the alert management computing device indicating that the alert zone has been revised and terminate the user alert upon determining that the clearing message indicates that the present passenger vehicle location is not included within the alert zone.

The passenger vehicle user computing device utilizes software to visualize and otherwise depict user alerts. Such software may be served by alert management computing device or any other suitable server. However, this software application may therefore render user alerts based on warnings received by alert management computing device. Accordingly, the software functions as client software interacting with a server represented by alert management computing device. Thus, the system described is implemented at least partially in a client-server model.

In some examples, the systems and methods described herein may be also used for pedestrian users, bicycle users, and any other users of computing devices similar to the passenger vehicle user computing device described herein. Further, in at least some examples, the systems and methods described may be used to coordinate emergency vehicle traffic so that such vehicles avoid one another.

In some examples, the alert management computing device may also determine traffic levels within an area (e.g., the alert zone) by processing a plurality of passenger vehicle location data for a plurality of passenger vehicles. Accordingly, the alert management computing device may determine the degree to which the area (e.g., the alert zone) is "busy". Such traffic density information may be used to create an alert zone specific to a busier area. Because high traffic areas necessarily include greater concentrations of passenger vehicle, the emergency vehicle may be more likely to need to move around passenger vehicles in its flow of traffic and enter oncoming traffic lanes. Accordingly, the alert zone may be defined to include portions of oncoming traffic when the emergency vehicle is determined to have approached a busy area. In at least one example, the alert management computing device determines that the emergency vehicle is stopped in a busy area or near a busy area of road. In such an example, the alert management computing device further identifies the alert zone for the emergency vehicle to include a portion of roadway associated with oncoming traffic.

The computer-implemented systems and methods described herein provide an efficient approach for receiving alerts regarding approaching emergency vehicles. More specifically, a passenger vehicle user computing device is configured to (a) retrieve location service information associated with the passenger vehicle user computing device from a location services routine, (b) identify a present passenger vehicle location and a present passenger vehicle trajectory based on the location service information, (c) transmit a set of passenger vehicle location data to an alert management computing device, (d) receive a warning from the alert management computing device including an alert zone description describing characteristics of an alert zone, wherein the alert zone defines a region projected to contain at least one emergency vehicle, and (e) generate a user alert upon determining that the present passenger vehicle location is included within the alert zone.

The systems and methods described herein are configured to provide a plurality of technical effects including but not limited to (i) reducing the risk of collisions between passenger vehicles and emergency vehicles, (ii) determining likely paths of emergency vehicles and reducing traffic by providing timely alerts to passenger vehicles, and (iii) increasing the safety and speed of emergency vehicles traveling to and from emergency locations.

Figure 1:
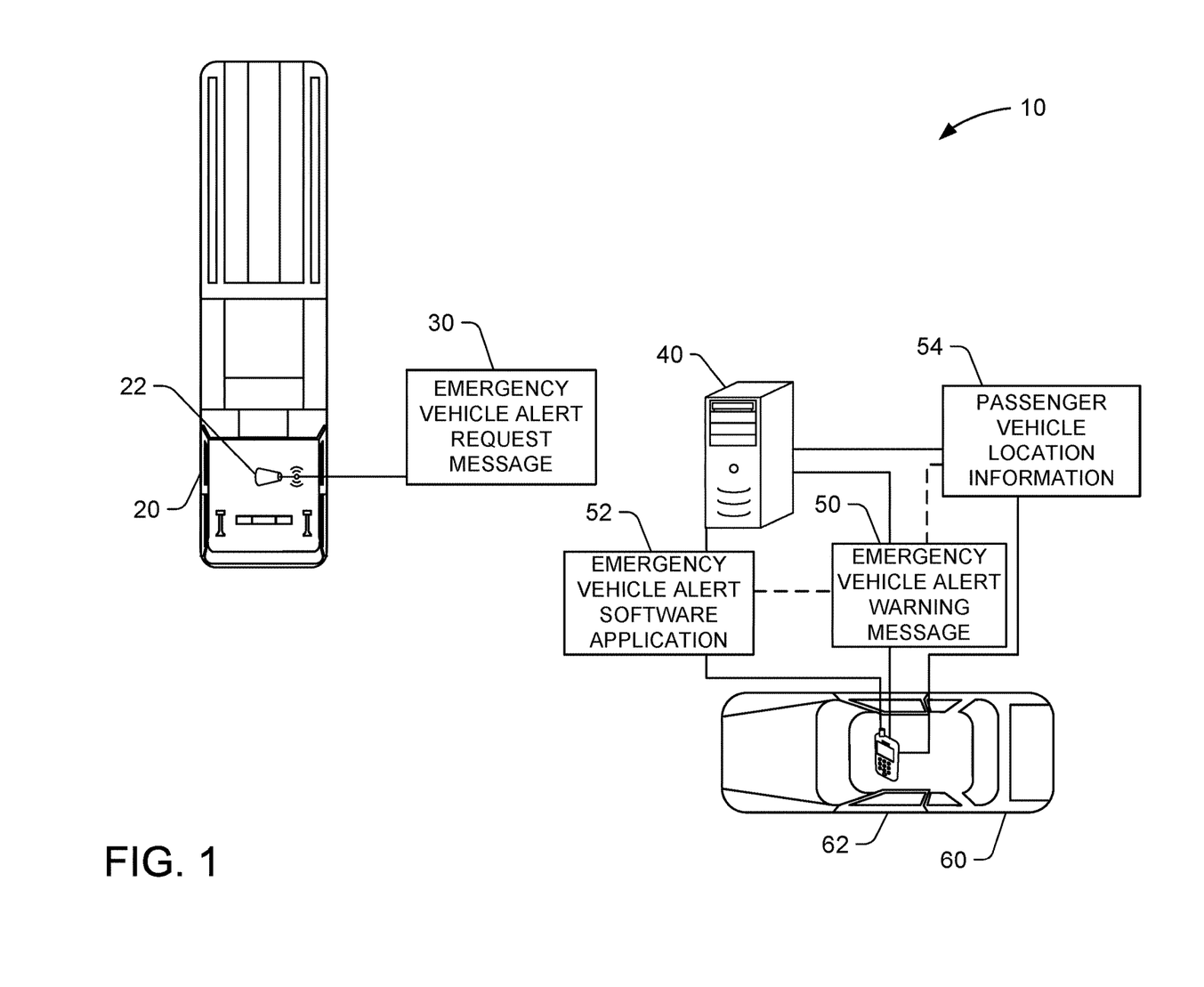
FIG. 1 is a schematic view of an emergency vehicle alert system including an emergency vehicle transmitter device coupled to an emergency vehicle, an alert management computing device, and a passenger vehicle user computing device coupled to a passenger vehicle.

FIG. 1 is a schematic view of an emergency vehicle alert system 10 including an emergency vehicle transmitter device 22 coupled to an emergency vehicle 20, an alert management computing device 40, and a passenger vehicle user computing device 62 coupled to a passenger vehicle 60.

Specifically, in operation emergency vehicle transmitter device 22 monitors for an indication of an emergency condition such as a visual flashing light or an audible siren. Accordingly, emergency vehicle transmitter device 22 may include, for example, a microphone, a camera, or any other suitable mechanism for detecting an indication of an emergency condition. As described above, emergency vehicle transmitter device 22 may detect for a particular frequency, decibel level, flashing light pattern, and duration of any such behavior. Alternately, emergency vehicle transmitter device 22 may be manually operated or hardwired to be activated when a siren or flasher is activated. Further, emergency vehicle transmitter device 22 may include a processor and memory. Emergency vehicle transmitter device 22 may also include a communication interface suitable for wireless communication with alert management computing device 40. Emergency vehicle transmitter device 22 may also include location tools for determining present emergency vehicle location, present emergency vehicle trajectory, present emergency vehicle velocity, and present emergency vehicle acceleration. Such location tools may include accelerometers, gyroscopes, and global positioning tools. In some examples, emergency vehicle transmitter device 22 is in communication with software used for navigation and mapping and may receive routing information for emergency vehicle 20.

Emergency vehicle transmitter device 22 transmits an emergency vehicle alert request message 30 to alert management computing device 40, as described above and herein. In one example, emergency vehicle alert request message 30 includes at least a present emergency vehicle location and a present emergency vehicle trajectory for emergency vehicle 20. In other examples, emergency vehicle alert request message 30 may include a timestamp, an identifier for emergency vehicle 20, a present emergency vehicle speed, a present emergency vehicle acceleration, and projected information related to emergency vehicle 20 based on routing or mapping information.

Alert management computing device 40 is also wirelessly in communication with passenger vehicle user computing devices 62 that are located in passenger vehicles 60. Passenger vehicle user computing devices 62 execute emergency vehicle alert software applications 52 that may be served or made available by alert management computing device 40. Alert management computing device 40 receives passenger vehicle location information 54 from passenger vehicle user computing devices. Passenger vehicle location information 54 may include a present passenger vehicle location and a present passenger vehicle trajectory. Passenger vehicle location information 54 may also include a present passenger vehicle velocity and a present passenger vehicle acceleration. Alert management computing device 40 identifies an alert zone for emergency vehicle 20 based on present emergency vehicle location and the present emergency vehicle trajectory and identifies a vehicle zone for passenger vehicle 60 based on the present passenger vehicle location and the present passenger vehicle trajectory. Alert management computing device 40 also determines whether passenger vehicle 60 is within the alert zone by comparing the vehicle zone of passenger vehicle 60 to the alert zone. If passenger vehicle 60 is within the alert zone, alert management computing device 40 transmits a warning to passenger vehicle 60 via passenger user computing device 62. The warning includes an alert zone description describing characteristics of the alert zone.

Figure 2:
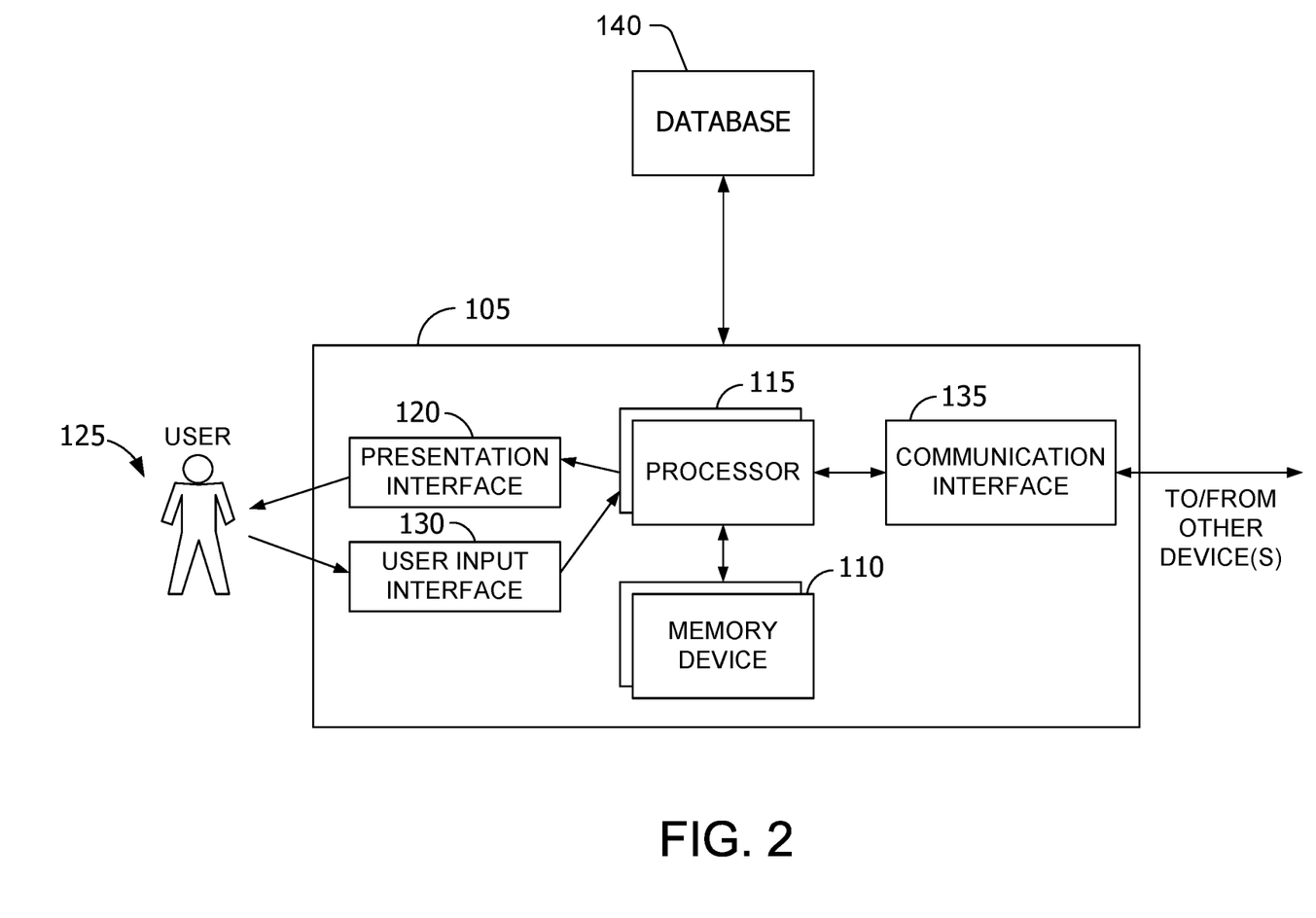
FIG. 2 is a block diagram of an exemplary computing device that may be used in the system shown in FIG. 1.

FIG. 2 is a block diagram of an exemplary computing device 105 that may be used in the system shown in FIG. 1. More specifically, computing device 105 may represent any of emergency vehicle transmitter device 22, alert management computing device 40, and passenger vehicle user computing device 62. Computing device 105 includes a memory device 110 and a processor 115 operatively coupled to memory device 110 for executing instructions. In the exemplary embodiment, computing device 105 includes a single processor 115 and a single memory device 110. In alternative embodiments, computing device 105 may include a plurality of processors 115 and/or a plurality of memory devices 110. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In the exemplary embodiment, memory device 110 is one or more devices that enable storage and retrieval of information such as executable instructions and/or other data. Memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 110 may be configured to store operational data including, without limitation, alert zone calculations, passenger vehicle location calculations, clearing signal calculations, siren and flash detection, and user alert generations. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate operation of the methods described.

In some embodiments, computing device 105 includes a user input interface 130. In the exemplary embodiment, user input interface 130 is coupled to processor 115 and receives input from user 125. User input interface 130 may include, without limitation, a keyboard, a pointing device, a mouse, a stylus, a touch sensitive panel, including, e.g., without limitation, a touch pad or a touch screen, and/or an audio input interface, including, e.g., without limitation, a microphone. A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to communication interface 135 of another computing device 105. Communications interface 135 facilitates machine-to-machine communications, i.e., acts as a machine-to-machine interface. Communications interface 135 may use any suitable protocols for communication to facilitate the wireless communications described herein.

Computing device 105 may also utilize any suitable tools, devices, and interfaces to identify location data. Computing device 105 may accordingly include and be in communication with accelerometers, gyroscopes, and global positioning tools.

Presentation interface 120 and/or communication interface 135 are both capable of providing information suitable for use with the methods described herein, e.g., to user 125 or another device. Accordingly, presentation interface 120 and communication interface 135 may be referred to as output devices. Similarly, user input interface 130 and communication interface 135 are capable of receiving information suitable for use with the methods described herein and may be referred to as input devices. In the exemplary embodiment, presentation interface 120 is used to visualize the data including, without limitation, mapping tools and user alerts.

In the exemplary embodiment, computing device 105 is an exemplary embodiment of computing devices to be used in alerting passenger vehicles of approaching emergency vehicles. In most embodiments, computing device 105 at least illustrates the primary design of such other devices.

Computing device 105 may also be in communication with database 140. As described herein, database 140 may be used to provide mapping information, routing information, and location information to facilitate the analysis of roads and highways as described.

Figure 3:
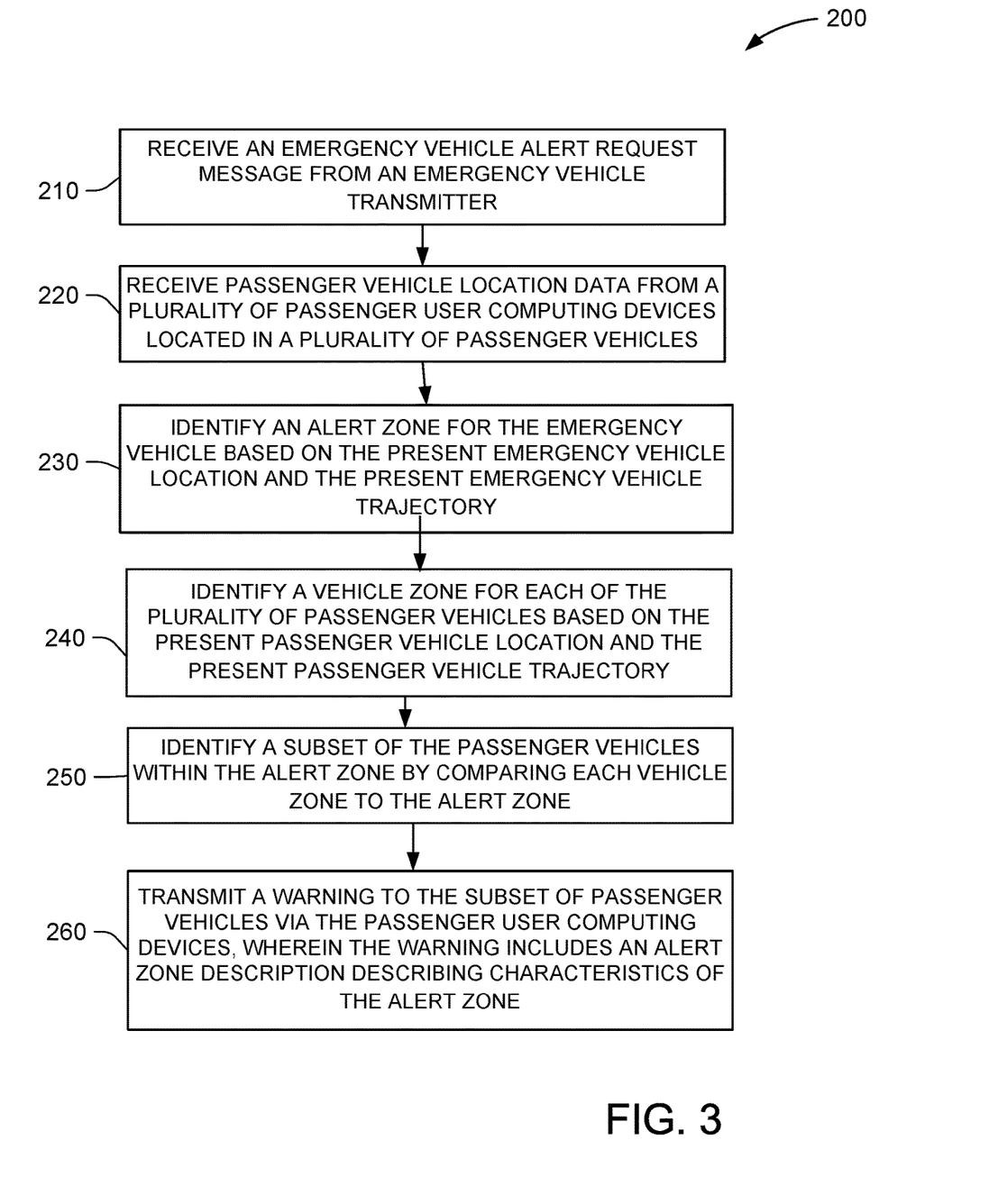
FIG. 3 is a flow chart of an exemplary process for alerting drivers of the presence of approaching emergency vehicles using the computing device of FIG. 2 in the system of FIG. 1.

FIG. 3 is a flow chart of an exemplary process for alerting drivers of the presence of approaching emergency vehicles using alert management computing device 40 (shown in FIG. 1). Alert management computing device 40 is configured to receive 210 an emergency vehicle alert request message from an emergency vehicle transmitter. More specifically, alert management computing device 40 is configured to receive 210 an emergency vehicle alert request message from an emergency vehicle transmitter, wherein the emergency vehicle alert request message includes a present emergency vehicle location and a present emergency vehicle trajectory.

Alert management computing device 40 is also configured to receive 220 passenger vehicle location data from a plurality of passenger user computing devices located in a plurality of passenger vehicles. More specifically, alert management computing device 40 is configured to receive 220 passenger vehicle location data from a plurality of passenger user computing devices located in a plurality of passenger vehicles, wherein the passenger vehicle location data includes a present passenger vehicle location and a present passenger vehicle trajectory.

Alert management computing device 40 is additionally configured to identify 230 an alert zone for the emergency vehicle based on the present emergency vehicle location and the present emergency vehicle trajectory.

Alert management computing device 40 is also configured to identify 240 a vehicle zone for each of the plurality of passenger vehicles based on the present passenger vehicle location and the present passenger vehicle trajectory.

Alert management computing device 40 is further configured to identify 250 a subset of the passenger vehicles within the alert zone by comparing each vehicle zone to the alert zone.

Alert management computing device 40 is also configured to transmit 260 a warning to the subset of passenger vehicles via the passenger user computing devices, wherein the warning includes an alert zone description describing characteristics of the alert zone.

Figure 4:
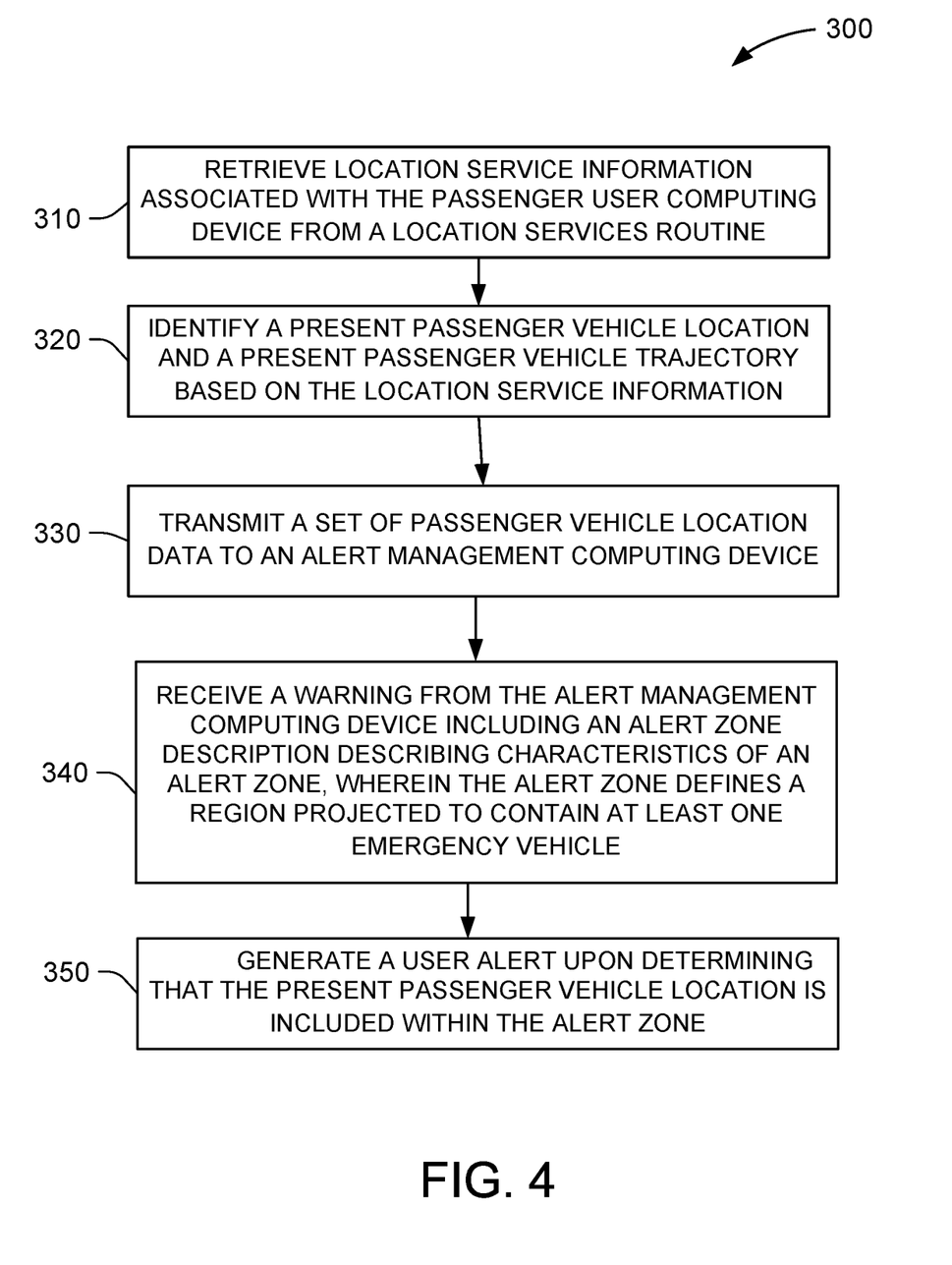
FIG. 4 is a flow chart of an exemplary process for receiving alerts regarding approaching emergency vehicles using the computing device of FIG. 2 in the system of FIG. 1.

FIG. 4 is a flow chart of an exemplary process for receiving alerts regarding approaching emergency vehicles using passenger vehicle user computing device 62 (shown in FIG. 1). Passenger vehicle user computing device 62 is configured to retrieve 310 location service information associated with the passenger user computing device from a location services routine. Passenger vehicle user computing device 62 is also configured to identify 320 a present passenger vehicle location and a present passenger vehicle trajectory based on the location service information. Passenger vehicle user computing device 62 is additionally configured to transmit 330 a set of passenger vehicle location data to an alert management computing device. Passenger vehicle user computing device 62 is also configured to receive 340 a warning from the alert management computing device including an alert zone description describing characteristics of an alert zone, wherein the alert zone defines a region projected to contain at least one emergency vehicle. Passenger vehicle user computing device 62 is additionally configured to generate 350 a user alert upon determining that the present passenger vehicle location is included within the alert zone.

Figure 5:
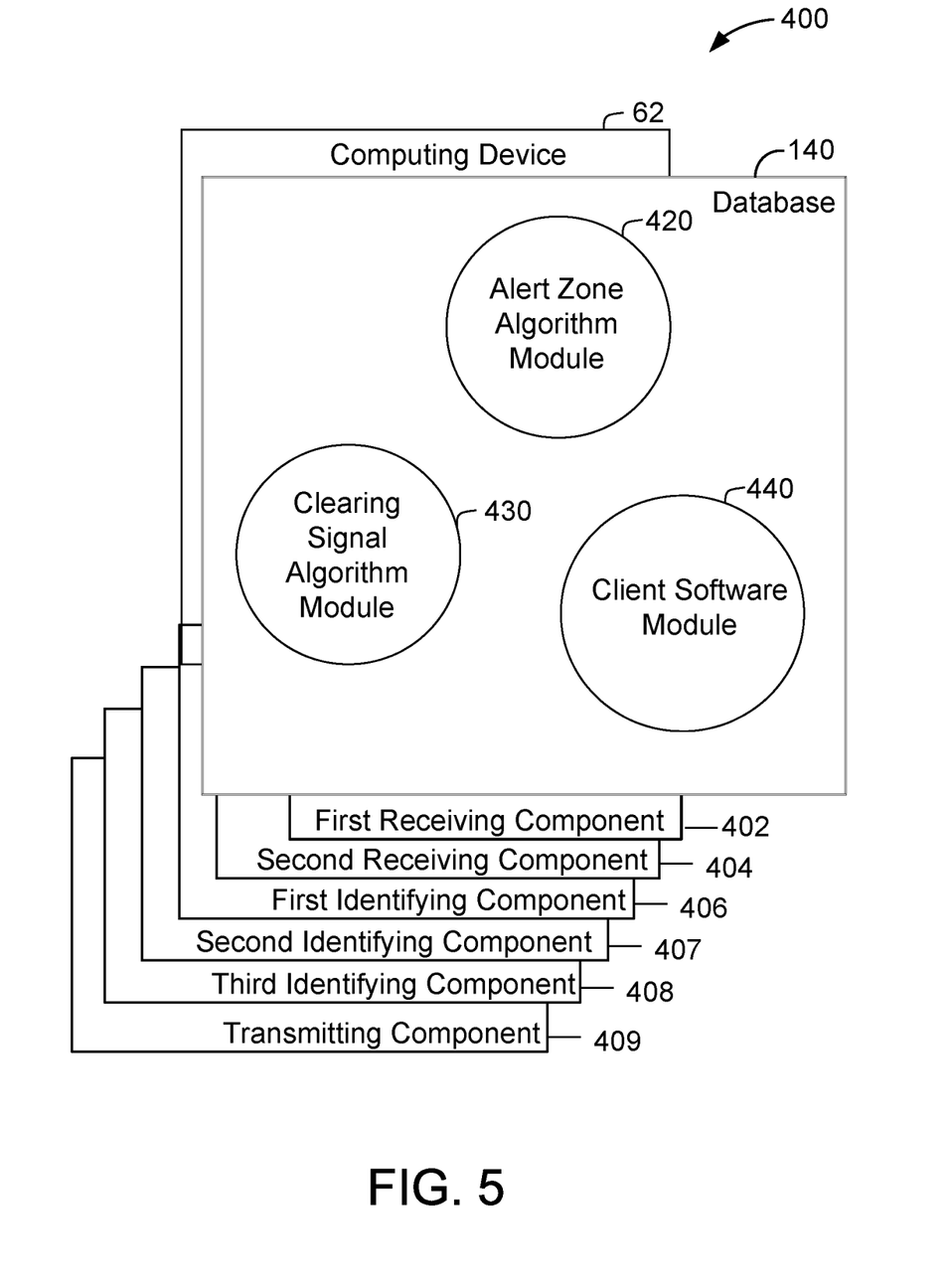
FIG. 5 is a diagram of components of one or more example computing devices that may be used in the environment shown in FIG. 1 to carry out the processes of FIGS. 3 and 4.

FIG. 5 is a diagram of components of one or more example computing devices that may be used in system 10 (shown in FIG. 1) to carry out the processes of FIGS. 3 and 4. FIG. 5 further shows a configuration of databases including at least database 140. Database 140 is coupled to several separate components within alert management computing device 62, which perform specific tasks.

Alert management computing device 62 includes a first receiving component 402 for receiving an emergency vehicle alert request message from an emergency vehicle transmitter, a second receiving component 404 for receiving passenger vehicle location data from a plurality of passenger user computing devices located in a plurality of passenger vehicles, a first identifying component 406 for identifying an alert zone for the emergency vehicle based on the present emergency vehicle location and the present emergency vehicle trajectory, a second identifying component 407 for identifying a vehicle zone for each of the plurality of passenger vehicles based on the present passenger vehicle location and the present passenger vehicle trajectory, a third identifying component 408 for identifying a subset of the passenger vehicles within the alert zone by comparing each vehicle zone to the alert zone, and a transmitting component 409 for transmitting a warning to the subset of passenger vehicles via the passenger user computing devices. In some examples, alert management computing device 62 may also include additional components (not shown) for identifying a unique identification data packet associated with each individual emergency vehicle. By using such components, the systems and methods described may also be able to identify specific emergency vehicles distinctly and perform additional processes including alerting emergency vehicles to the presence of other emergency vehicles and thereby avoiding collisions between such vehicles.

In an exemplary embodiment, database 140 is divided into a plurality of sections, including but not limited to, an alert zone algorithm module 420, a clearing signal algorithm module 420, and a client software module 440. These sections within database 140 are interconnected to update and retrieve the information as required.

The above-described computer-implemented systems and methods provide an efficient approach for alerting passenger vehicles to approaching emergency vehicles. The systems and methods substantially improve the safety and efficiency of traffic during emergency vehicle travel.

Exemplary embodiments for alerting passenger vehicles to approaching emergency vehicles are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other systems and environments and are not limited to the environments as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for alerting passenger vehicles of approaching emergency vehicles, said method implemented by an alert management computing device including a processor and a memory device coupled to the processor, said method comprising:

receiving an emergency vehicle alert request message from an emergency vehicle transmitter, receiving a present emergency vehicle location and at least one of a present emergency vehicle speed, a present emergency vehicle trajectory, and a present emergency vehicle acceleration from the emergency vehicle transmitter;

receiving passenger vehicle location data from a plurality of passenger vehicle user computing devices located in a plurality of passenger vehicles, wherein the passenger vehicle location data includes a present passenger vehicle location and at least one of a present passenger vehicle speed, a present passenger vehicle trajectory, and a present passenger vehicle acceleration;

calculating an alert zone for the emergency vehicle as a function of the present emergency vehicle location and at least one of the present emergency vehicle speed, the present emergency vehicle trajectory, and the present emergency vehicle acceleration, wherein the alert zone includes an area adjacent the emergency vehicle and wherein the area of the alert zone is determined as a function of at least one of the emergency vehicle speed and the emergency vehicle acceleration;

increasing the area of the alert zone in response to an increase in the at least one of the emergency vehicle speed and the emergency vehicle acceleration;

decreasing the area of the alert zone in response to a decrease in the at least one of the emergency vehicle speed and the emergency vehicle acceleration;

calculating a vehicle zone for each of the plurality of passenger vehicles as a function of the present passenger vehicle location and at least one of a present passenger vehicle speed, a present passenger vehicle trajectory, and a present passenger vehicle acceleration;

identifying a subset of the plurality of passenger vehicles within the alert zone by comparing each vehicle zone to the alert zone, wherein the subset of the plurality of passenger vehicles consists of passenger vehicles whose vehicle zone partially overlaps the alert zone; and transmitting a warning message to the subset of the plurality of passenger vehicles via the passenger vehicle user computing devices.

2. The method of claim 1 further comprising:

determining when the emergency vehicle has stopped as a function of either the emergency vehicle alert request message or the emergency vehicle speed being zero; and reducing the area of the alert zone upon determining that the emergency vehicle has stopped.

3. The method of claim 1 further comprising:

determining when the emergency vehicle is on a highway as a function of the emergency vehicle alert request message or the present emergency vehicle location; and calculating, in response to said determining step, the alert zone for the emergency vehicle wherein the alert zone includes a portion of the highway aligned with a flow of traffic in a direction of the emergency vehicle.

4. The method of claim 1 further comprising:

determining when the emergency vehicle is at a traffic intersection as a function of the emergency vehicle alert request message or the present emergency vehicle location; and calculating, in response to said determining step, the alert zone for the emergency vehicle wherein the alert zone includes a road comprising the intersection.

5. The method of claim 1 further comprising:

determining when the emergency vehicle has stopped as a function of either the emergency vehicle alert request message or the emergency vehicle speed being zero;

determining when the emergency vehicle is located near a high traffic area as a function of the emergency vehicle alert request message or the present emergency vehicle location; and calculating, in response to said determining steps, the alert zone for the emergency vehicle wherein the alert zone includes a portion of a roadway aligned with a flow of traffic in a direction of the emergency vehicle.

6. The method of claim 1 wherein the passenger vehicle user computing devices further comprise a smartphone, a cellular telephone, a wearable computing technology, a touch screen, a keyboard, or a tablet computing device.

7. An alert management computing device for alerting passenger vehicles of approaching emergency vehicles, the alert management computing device comprising:

a processor; and a memory coupled to the processor, said processor programmed to:

receive a vehicle alert request message from an emergency vehicle transmitter, wherein the vehicle alert request message includes a present emergency vehicle location and at least one of a present emergency vehicle speed, a present emergency vehicle trajectory, and a present emergency vehicle acceleration;

receive passenger vehicle location data from a plurality of passenger vehicle user computing devices located in a plurality of passenger vehicles, wherein the passenger vehicle location data includes a present passenger vehicle location and at least one of a present passenger vehicle speed, a present passenger vehicle trajectory, and a present passenger vehicle acceleration;

calculate an alert zone for the emergency vehicle as a function of the present emergency vehicle location and at least one of a present emergency vehicle speed, a present emergency vehicle trajectory, and a present emergency vehicle acceleration, increase the area of the alert zone in response to an increase in the at least one of the emergency vehicle speed and the emergency vehicle acceleration;

decrease the area of the alert zone in response to a decrease in the at least one of the emergency vehicle speed and the emergency vehicle acceleration;

calculate a vehicle zone for each of the plurality of passenger vehicles as a function of at least one of the present passenger vehicle location, the present passenger vehicle speed, the present passenger vehicle trajectory, and the present passenger vehicle acceleration;

identify a subset of the plurality of passenger vehicles within the alert zone by comparing each vehicle zone to the alert zone, wherein the subset of the plurality of passenger vehicles consists of passenger vehicles whose vehicle zone partially overlaps the alert zone; and transmit a warning message to the subset of the plurality of passenger vehicles via the passenger vehicle user computing devices.

8. The alert management computing device of claim 7 wherein the processor is further programmed to:
determine when the emergency vehicle has stopped as a function of either the emergency vehicle alert request message or the emergency vehicle speed being zero; and
reduce the area of the alert zone upon determining that the emergency vehicle has stopped.

9. The alert management computing device of claim 7 wherein the processor is further programmed to:
determine when the emergency vehicle is on a highway as a function of the emergency vehicle alert request message or present emergency vehicle location; and
calculate the alert zone for the emergency vehicle wherein the alert zone includes a portion of the highway aligned with a flow of traffic in a direction of the emergency vehicle.

10. The alert management computing device of claim 7 wherein the processor is further programmed to:
determine when the emergency vehicle is at a traffic intersection as a function of the emergency vehicle alert request message or the present emergency vehicle location; and
calculate the alert zone for the emergency vehicle wherein the alert zone includes a road comprising the intersection.

11. The alert management computing device of claim 7 wherein the processor is further programmed to:
determine when the emergency vehicle has stopped as a function of either the emergency vehicle alert request message or the emergency vehicle speed being zero;
determine when the emergency vehicle is located near a high traffic area as a function of the emergency vehicle alert request message or the present emergency vehicle location; and
calculate the alert zone for the emergency vehicle wherein the alert zone includes a portion of a roadway aligned with a flow of traffic in a direction of the emergency vehicle.

12. The alert management computing device of claim 7 wherein the passenger vehicle user computing devices further comprise a smartphone, a cellular telephone, a wearable computing technology, a touch screen, a keyboard, or a tablet computing device.

13. A system for providing an emergency vehicle alert comprising:
an alert management computing device; and
an emergency vehicle transmitter associated with an emergency vehicle, the emergency vehicle transmitter configured to transmit information including a present location of the emergency vehicle and at least one of an emergency vehicle speed and an emergency vehicle acceleration to the alert management computing device;
wherein the alert management computing device is configured to:
receive the information transmitted by the emergency vehicle transmitter; and determine an alert zone for the emergency vehicle having an area determined as a function of the information received from the emergency vehicle transmitter including the present location of the emergency vehicle and at least one of the emergency vehicle speed and the emergency vehicle acceleration;
expand the area of the alert zone in response to an increased speed or acceleration of the emergency vehicle; and
contract the area of the alert zone in response to a decreased speed or deceleration of the emergency vehicle;
wherein the alert zone includes an area adjacent the emergency vehicle;
a portable transmitter configured to be associated with a person, the portable transmitter further configured to transmit information including a present location of the portable transmitter to the alert management computing device;
wherein the alert management computing device is configured to:
receive the information transmitted by the portable transmitter; and
determine a protected zone for the portable transmitter as a function of the information received from the portable transmitter;
a portable receiver configured to be associated with the person;
an emergency warning device associated with the portable receiver;
wherein the alert management computing device is further configured to:
compare the alert zone for the emergency vehicle to the protected zone for the portable transmitter; and send an alert signal to the portable receiver as a function of a partial overlap between the alert zone and the protected zone; and wherein the emergency warning device is responsive to the portable receiver for providing a warning as a function of a received alert signal.

14. The system of claim 13 wherein the portable transmitter is further configured for use on the person while the person is traveling in a passenger vehicle such that the location of the person corresponds to the location of the passenger vehicle, and wherein the portable transmitter is further configured while traveling to transmit at least one of a present passenger vehicle speed, a present passenger vehicle trajectory, and a present passenger vehicle acceleration to the alert management computing device.

15. The system of claim 14 wherein the portable transmitter, the portable receiver, and the emergency warning device associated with the portable receiver further comprise a smartphone, a cellular telephone, a wearable computing technology, a touch screen, a keyboard, or a tablet computing device; and wherein the warning includes a map data.

16. The system of claim 14 further comprising a plurality of portable transmitters, corresponding portable receivers, and emergency warning devices associated, respectively, with the plurality of portable receivers;

wherein the alert management computing device is further configured to:

receive the information transmitted by the respective portable transmitters; and determine a protected zone for each respective portable transmitter as a function of the information received from the respective portable transmitters;

compare the alert zone for the emergency vehicle to the protected zones for the respective portable transmitters to send an alert signal to each respective corresponding portable receivers as a function of the comparison between the alert zone and the respective protected zones; and wherein the respective emergency warning device is responsive to the respective portable receiver for providing a warning as a function of a received alert signal;

wherein the warning includes a map data.

17. The system of claim 14 wherein the portable transmitter and the portable receiver are further configured to communicate with the alert management computing device using a communication protocol.

18. The system of claim 14 wherein the alert management computing device is further configured to:

determine the alert zone for the emergency vehicle as a function of the information received from the emergency vehicle transmitter and of a speed limit associated with the present location of the emergency vehicle; and determine the protected zone for the portable transmitter as a function of the information received from the portable transmitter and of a speed limit associated with the present location of the portable transmitter;

wherein the warning includes a map data.

19. The system of claim 14 wherein the alert management computing device is further configured to:

determine when the emergency vehicle has stopped as a function of either the emergency vehicle alert request message or the emergency vehicle speed being zero; and reducing the area of the alert zone upon determining that the emergency vehicle has stopped;

wherein the warning includes a map data.

20. An alert management system for monitoring an emergency vehicle and a passenger vehicle, the emergency vehicle having an emergency vehicle transmitter configured to transmit information including a present location of the emergency vehicle to the alert management system and the passenger vehicle having a passenger vehicle transmitter configured to transmit information including a present location of the passenger vehicle and at least one of an emergency vehicle speed and an emergency vehicle acceleration to the alert management system, the passenger vehicle further having a passenger vehicle receiver and an emergency warning device coupled to the passenger vehicle receiver, the alert management system comprising:

a receiver for receiving the information transmitted by the emergency vehicle transmitter and by the passenger vehicle transmitter;

a processor coupled to the receiver adapted to determine an alert zone for the emergency vehicle having an area determined as a function of the information received from the emergency vehicle transmitter including the present location of the emergency vehicle and at least one of the emergency vehicle speed and the emergency vehicle acceleration and to determine a vehicle zone for the passenger vehicle as a function of the information received from the passenger vehicle transmitter;

wherein the processor is further adapted to:

expand the area of the alert zone in response to an increased speed or acceleration of the emergency vehicle; and contract the area of the alert zone in response to a decreased speed or deceleration of the emergency vehicle;

wherein the alert zone includes an area next to the emergency vehicle;

a transmitter for transmitting information to the passenger vehicle receiver, wherein the processor is coupled to the transmitter and is configured to:

compare the alert zone for the emergency vehicle to the vehicle zone for the passenger vehicle; and send an alert signal via the transmitter to the passenger vehicle receiver as a function of a partial overlap between the alert zone and the vehicle zone, whereby the emergency warning device is activated in response to the alert signal to provide a warning in the passenger vehicle.

21. The alert management system claim 20 wherein:

the emergency vehicle transmitter is further configured to transmit emergency vehicle location data including a present emergency vehicle location and at least one of a present emergency vehicle speed, a present emergency vehicle trajectory, and a present emergency vehicle acceleration;

the passenger vehicle transmitter is further configured to transmit passenger vehicle location data including a present passenger vehicle location and at least one of a present passenger vehicle speed, a present passenger vehicle trajectory, and a present passenger vehicle acceleration;

the receiver is further configured to receive said transmitted information; and the processor is further configured to determine the alert zone for the emergency vehicle as a function of said information received from the emergency vehicle transmitter and to determine the vehicle zone for the passenger vehicle as a function of said information received from the passenger vehicle transmitter.

22. The alert management system of claim 21 wherein the alert management system is further configured to:

determine the alert zone for the emergency vehicle as a function of the information received from the emergency vehicle transmitter and of a speed limit associated with the current location of the emergency vehicle; and determine the vehicle zone for the passenger vehicle as a function of the information received from the passenger vehicle transmitter and of a speed limit associated with the current location of the passenger vehicle.

23. The alert management system of claim 20 wherein the passenger vehicle transmitter, the passenger vehicle receiver, and the emergency warning device associated with the respective passenger vehicle receiver further comprise a smartphone, a cellular telephone, a wearable computing technology, a touch screen, a keyboard, or a tablet computing device; wherein the warning includes a map data.

24. The alert management system of claim 20 wherein the plurality of passenger vehicle transmitters and passenger vehicle receivers are further configured to communicate with the alert management system using a communication protocol.

25. The alert management system of claim 20 wherein the alert management system is further configured to:

determine the alert zone for the emergency vehicle as a function of the information received from the emergency vehicle transmitter and of a speed limit associated with the current location of the emergency vehicle; and determine the vehicle zone for the passenger vehicle as a function of the information received from the passenger vehicle transmitter and of a speed limit associated with the current location of the passenger vehicle; and wherein the warning includes a map data.

* * * * *